(12) United States Patent
Hall

(10) Patent No.: US 6,382,679 B1
(45) Date of Patent: May 7, 2002

(54) METER LOOP FRAME ASSEMBLY

(75) Inventor: Howard W. Hall, Shawnee, OK (US)

(73) Assignee: Uponor Aldyl Company, Shawnee, OK (US)

( * ) Notice: Subject to any disclaimer, the term of this patent is extended or adjusted under 35 U.S.C. 154(b) by 0 days.

(21) Appl. No.: 09/627,942

(22) Filed: Jul. 28, 2000

(51) Int. Cl.$^7$ ............................................... F16L 35/00
(52) U.S. Cl. ........................ 285/30; 29/890.149; 73/201
(58) Field of Search ........................... 285/30, 134.1, 285/135.1, FOR 108, FOR 110, FOR 139; 73/201; 29/890.14, 890.149; 248/68.1, 69

(56) References Cited

U.S. PATENT DOCUMENTS

| | | | |
|---|---|---|---|
| 2,057,038 A | * 10/1936 | Lindquist et al. | ......... 285/134.1 |
| 2,153,343 A | * 4/1939 | Ruscher | ........................ 285/30 |
| 2,303,950 A | * 12/1942 | Nordell | ............... 285/134.1 X |
| 3,216,025 A | * 11/1965 | Roll | ........................ 248/68.1 X |
| 3,506,229 A | * 4/1970 | McDowell | .................. 248/68.1 |
| 3,815,859 A | 6/1974 | Leopold, Jr. et al. | |
| 5,833,179 A | * 11/1998 | VandenBerg | ........... 248/68.1 X |
| 5,992,439 A | * 11/1999 | McGill | ..................... 285/30 X |

OTHER PUBLICATIONS

Schuler Manufacturing Company, Inc.; Schuler; 1995; 7 pages; Ohio.
R.W. Lyall & Company, Inc.; Steel Fabrication; Website; 1998; 2 pages; Corona, California.

* cited by examiner

*Primary Examiner*—Lynne H. Browne
*Assistant Examiner*—Greg Binda
(74) *Attorney, Agent, or Firm*—Dunlap, Codding & Rogers, Inc.

(57) ABSTRACT

A meter loop frame assembly for connecting a gas meter to a gas supply line and a gas service line. The meter loop frame assembly includes a gas inlet conduit, a gas outlet conduit, and a brace. The gas inlet conduit is shaped and oriented such that the gas supply line is connectable to a second end of the gas inlet conduit at a location on the rear side of the gas meter and substantially vertically aligned with the centerline of the gas meter so that a pressure regulator of the gas supply line is substantially obstructed from view from a position on the front side of the gas meter.

9 Claims, 3 Drawing Sheets

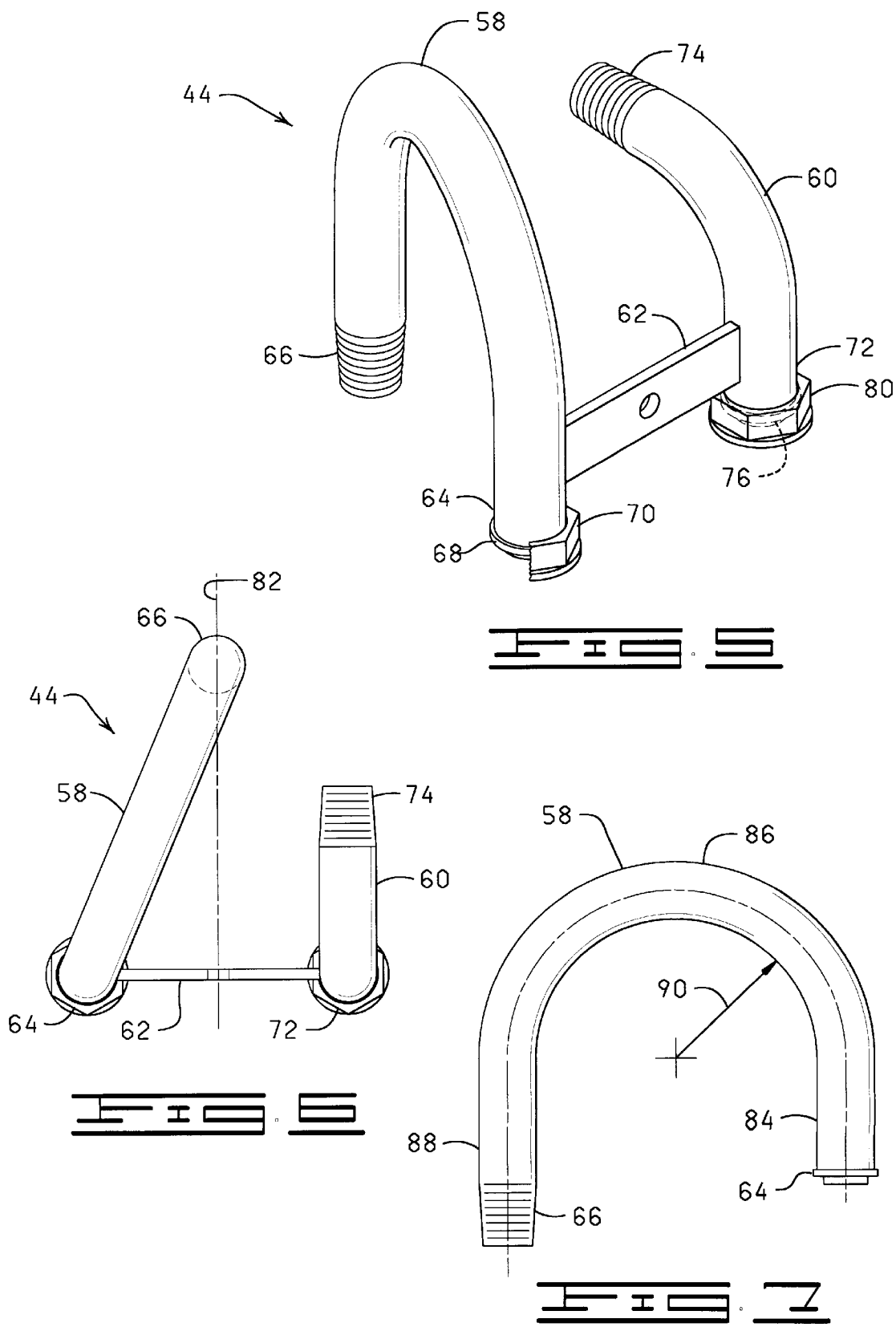

METER LOOP FRAME ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to piping for gas meters, and more particularly, but not by way of limitation, to an improved meter loop frame assembly and method for interposing and connecting a gas meter to a gas line such that ancillary components of the gas line are substantially obstructed from view from a position in front of the gas meter.

2. Brief Description of the Related Art

Natural gas is a fuel used widely for industrial and domestic heating. To determine the amount of gas a customer consumes, a gas company interposes a gas meter in the gas line leading into each customer's dwelling. The gas meter connects a gas supply line leading from a gas supply to a gas service line extending to the point of use.

The gas supply line is generally buried underground and includes a riser that extends from the ground at the point where the gas meter is to be positioned. The riser also accommodates ancillary components, such as shut off valves and flow regulators. Similarly, the gas service line includes a riser that extends back into the ground, or the riser runs directly into the side of the dwelling. An inlet of the gas meter is connected to the riser of the gas supply line and an outlet of the gas meter is connected to the riser of the gas service line such that the gas meter is suspended between the two risers.

It has long been the practice of gas companies to have the gas supply line riser positioned to the side of the gas meter. The connection between the inlet of the gas meter and the riser is often accomplished by using a series of nipples and elbows which results in the creation of multiple points of potential leaks. To overcome this problem, meter loop frame assemblies, also known as meter settings, have been used. Meter loop frame assemblies are generally single piece manifolds used to connect the gas meter to the gas supply line and the gas service line. While the use of meter loop frame assemblies increase the integrity of the connection of the gas meter, and the sideways extension of the meter loop frame assembly facilitates access to ancillary components of the gas supply line mentioned above, the gas meter can be extremely unattractive, particularly when positioned in the front of a dwelling or in line with other gas meters, such as may be found at an apartment complex.

To this end, a need exists for an improved meter loop frame assembly which results in the gas supply line riser and the ancillary components attached thereto to be positioned on the rear side of the gas meter and thereby provide a more aesthetic unit. It is to such an assembly and method that the present invention is directed.

BRIEF SUMMARY OF THE INVENTION

The present invention is directed to a meter loop frame assembly for connecting a gas meter to a gas supply line and a gas service line. The meter loop frame assembly includes a gas inlet conduit, a gas outlet conduit, and a brace. The gas inlet conduit has a first end and a second end with the first end being connectable to the gas inlet of the gas meter and the second end being connectable to the gas supply line. The gas outlet conduit also has a first end and a second end with the first end being connectable to the gas outlet of the gas meter and the second end being connectable to the gas supply line. The brace rigidly connects the gas inlet conduit to the gas outlet conduit so that the first end of the gas inlet conduit is spaced a distance from the first end of the gas outlet conduit which corresponds to the distance between the gas inlet and the gas outlet of the gas meter.

The gas inlet conduit is shaped and oriented such that the second end of the gas inlet conduit is positioned on the rear side of the gas meter when the first end of the gas inlet conduit is connected to the gas inlet of the gas meter and the first end of the gas outlet conduit is connected to the gas outlet of the gas meter whereby the gas supply line is connectable to the second end of the gas inlet conduit at a location on the rear side of the gas meter and substantially vertically aligned with the centerline of the gas meter so that a pressure regulator of the gas supply line is substantially obstructed from view from a position on the front side of the gas meter.

In another aspect, the present invention is directed to a method for connecting a gas meter to a gas supply line and a gas service line by orienting a gas inlet conduit such that first end of the gas inlet conduit is connectable to the gas inlet of the gas meter and a second end of the gas inlet conduit is positioned on the rear side of the gas meter and in vertical alignment with a centerline of the gas meter. The first end of the gas inlet conduit is connected to the gas inlet of the gas meter and the second end of the gas inlet conduit is connected to the gas supply line whereby a pressure regulator of the gas supply line is substantially obstructed from view from a position on the front side of the gas meter.

The features and advantages of the present invention will become apparent from the following detailed description when read in conjunction with the accompanying drawings and appended claims.

BRIEF DESCRIPTION OF THE SEVERAL VIEWS OF THE DRAWING

FIG. 5 is a partially cutaway, perspective view of the meter loop frame assembly of the present invention.

FIG. 6 is a top plan view of the meter frame loop assembly of the present invention.

FIG. 7 is a side elevational view of the gas inlet conduit of the meter loop frame assembly of the present invention.

DETAILED DESCRIPTION OF THE INVENTION

Figure 1:
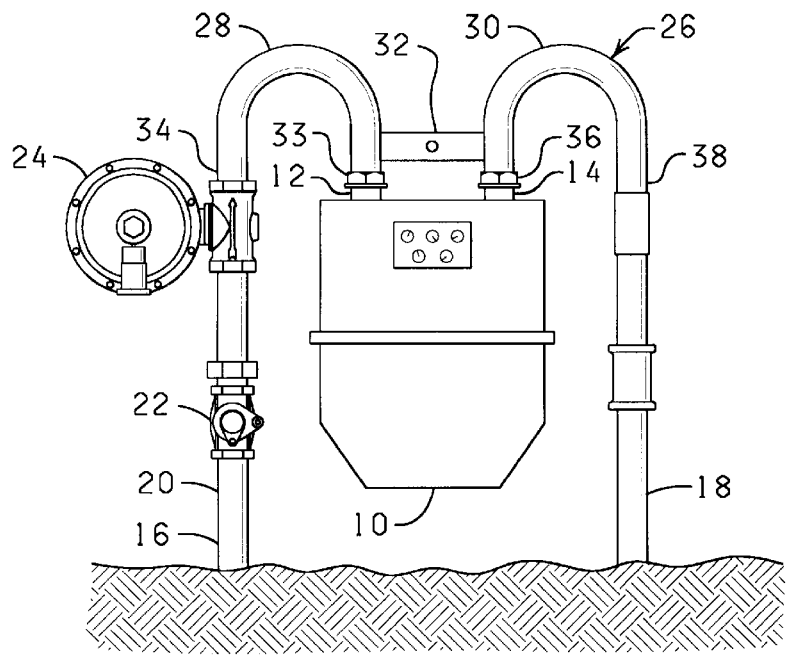
FIG. 1 is a front elevational view of a gas meter shown connected to a gas supply line and a gas service line with a prior art meter loop frame assembly.

Referring now to the drawings and more particularly to FIG. 1, a conventional gas meter 10 having an inlet 12 and an outlet 14 is shown interposed between a gas supply line 16 and a gas service line 18 for measuring the flow of gas passing from the gas supply line 16 to the gas service line 18. The gas supply line 16 is connected to a supply of gas and includes a riser 20 extending from the ground. The riser 20 is provided with a shut-off valve 22 and a pressure regulator 24. The gas service line 18 is connected to a point of use, such as a dwelling or the like.

As mentioned above, it has long been the practice of gas companies to have the riser 20 of the gas supply line 16 positioned to the side of the gas meter 10, as illustrated in FIG. 1. In the past, the connection between the inlet of the gas meter and the riser was accomplished by using a series of unions (not shown) which results in the creation of multiple points of potential leaks. To overcome this problem, meter loop frame assemblies, also known as meter settings, have been used.

FIG. 1 illustrates an example of a prior art meter loop frame assembly 26 used to connect the gas meter 10 to the gas supply line 16 and the gas service line 18. The meter loop frame assembly 26 includes a gas inlet conduit 28, a gas outlet conduit 30, and a brace 32 which rigidly connects the gas inlet conduit 28 to the gas outlet conduit 30. The gas inlet conduit 28 has a first end 33 connectable to the inlet 12 of the gas meter 10 and a second end 34 connectable to the gas supply line 16. Similarly, the gas outlet conduit 30 has a first end 36 connectable to the outlet 14 of the gas meter 10 and a second end 38 connectable to the gas service line 18.

The gas inlet conduit 28 is shaped and oriented such that the second end 34 of the gas inlet conduit 28 is positioned on the side of the gas meter 10 when the first end 33 of the gas inlet conduit 28 is connected to the gas inlet 12 of the gas meter 10 whereby the gas supply line 16 is connected to the second end 34 of the gas inlet conduit 28 at a location on the side of the gas meter 10 so that the riser 20 of the gas supply line 16 and the shut-off valve 22 and the pressure regulator 24 are in total view from a position on the front side of the gas meter 10. The sight of these components in combination with the gas meter 10 greatly diminishes the aesthetic appearance of the dwelling when the gas meter 10 is positioned near the dwelling.

Figure 2:
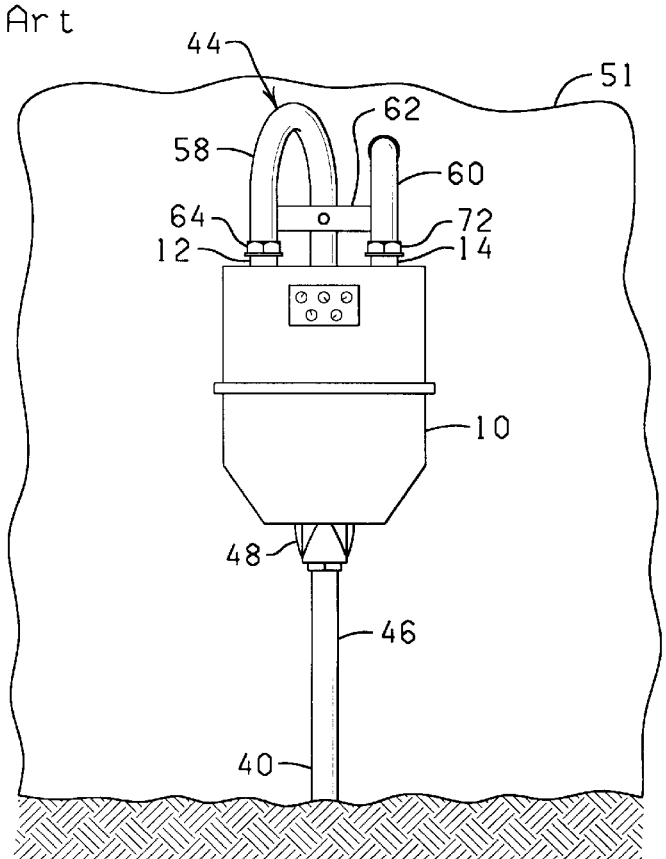
FIG. 2 is a front elevational view of a gas meter shown connected to a gas supply line and a gas service line with a meter loop frame assembly constructed in accordance with the present invention.
Figure 3:
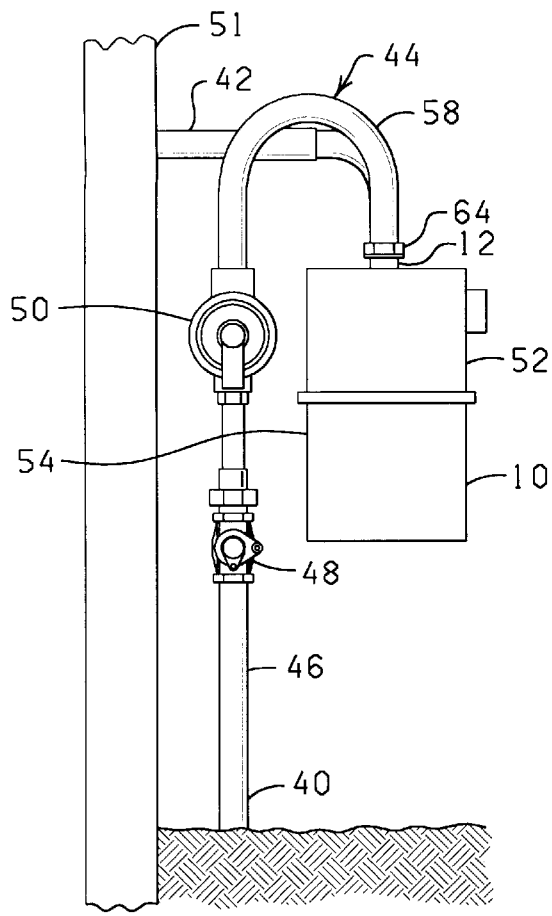
FIG. 3 is a side elevational view of the gas meter shown connected to the gas supply line and the gas service line with the meter loop frame assembly of the present invention.
Figure 4:
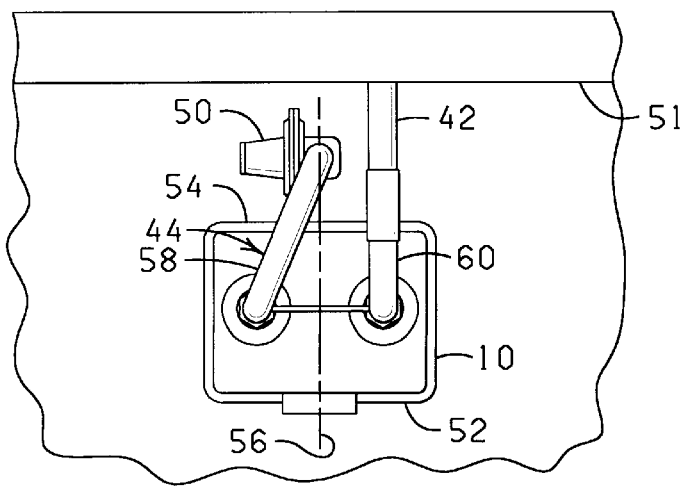
FIG. 4 is a top plan view of the gas meter shown connected to the gas supply line and the gas service line with the meter loop frame assembly of the present invention.

Referring now to FIGS. 2–4, the gas meter 10 of FIG. 1 is shown connected to a gas supply line 40 and a gas service line 42 using a meter loop frame assembly 44 constructed in accordance with the present invention. The gas supply line 40 includes a riser 46 provided with a shut-off valve 48 and a pressure regulator 50. The gas service line 42 is illustrated as extending directly into the side of a dwelling 51.

The gas meter 10 is further characterized as having a front side 52, a rear side 54, and a centerline 56 (FIG. 4) extending from the front side 52 to the rear side 54. As best illustrated in FIG. 2, one of the advantages of the meter loop frame assembly 44 of the present invention is that a portion of the gas supply line 40, as well as the pressure regulator 50 and the shut-off valve 48, are able to be substantially obstructed from view from a position on the front side 52 of the gas meter 10.

Referring now to FIGS. 5–7, the meter loop frame assembly 44 includes a gas inlet conduit 58, a gas outlet conduit 60, and a brace 62 for rigidly connecting the gas inlet conduit 58 to the gas outlet conduit 60. The gas inlet conduit 58 has a first end 64 and a second end 66. The first end 64 is illustrated as being provided with a flange 68 which is adapted to be connected to the gas inlet 12 of the gas meter 10 with the use of a meter nut 70. The second end 66 of the gas inlet conduit 58 is shown to be threaded to facilitate connection to the gas supply line 40 in a conventional manner. Similarly, the gas outlet conduit 60 has a first end 72 and a second end 74. The first end 72 is illustrated as being provided with a flange 76 which is adapted to be connected to the gas outlet 14 of the gas meter 10 with the use of a meter nut 80. The second end 74 of the gas outlet conduit 60 is shown to be threaded to facilitate connection to the gas service line 42 in a conventional manner. It will be appreciated that the configuration of the ends of the gas inlet 58 and the gas outlet 60 can be varied depending on the type of connection to permit connection with a variety of different gas meters, gas supply lines; and gas service lines. Each of the gas inlet conduit 58 and the gas outlet conduit 60 is fabricated of a sufficiently rated piping material, such as a schedule 40 pipe.

The brace 62 is a rigid member having one end connected to the gas inlet conduit 58 and another end connected to the gas outlet conduit 60 so as to rigidly connect the gas inlet conduit 58 to the gas outlet conduit 60 and thereby provide a uniform assembly. The brace 62 fixes the gas inlet conduit 58 to the gas outlet conduit 60 so that the first end 64 of the gas inlet conduit 58 is spaced a distance from the first end 72 of the gas outlet conduit 60 which corresponds to the distance between the gas inlet 12 and the gas outlet 14 of the gas meter 10. The brace 62 further fixes the orientation of the gas inlet conduit 58 and the gas outlet conduit 60 relative to one another.

To enable the gas supply line 40 to be connected to the second end 66 of the gas inlet conduit 58 at a location on the rear side 54 of the gas meter 10 so that a portion of the gas supply line 40 and the pressure regulator 50 are substantially obstructed from view from a position on the front side 52 of the gas meter 10, the gas inlet conduit 58 is shaped and oriented such that the second end 66 of the gas inlet conduit 58 is positioned on the rear side 54 of the gas meter 10 when the first end 64 of the gas inlet conduit 58 is connected to the gas inlet 12 of the gas meter 10 and the first end 72 of the gas outlet conduit 60 is connected to the gas outlet 14 of the gas meter 10. More particularly, the gas inlet conduit 58 is shaped and oriented such that the second end 66 of the gas inlet conduit 58 is substantially vertically aligned with the centerline 56 of the gas meter 10, as best shown in FIG. 4, when the first end 64 of the gas inlet conduit 58 is connected to the gas inlet 12 of the gas meter 10 and the first end 72 of the gas outlet conduit 60 is connected to the outlet 14 of the gas meter 10. By the second end 66 of the gas inlet conduit 58 being positioned in or near vertical alignment with the centerline 56 of the gas meter 10, the ability to position the pressure regulator 50 and the shut-off valve 48 within the confines of the rear side 54 of the gas meter 10 such that the pressure regulator 50 and the shut-off valve 48 are substantially obstructed from view from a position on the front side 52 is facilitated.

Because the inlet and the outlet of gas meters are generally symmetrically formed on the top of the gas meter, the gas inlet conduit 58 is shaped and oriented such that the second end 66 of the gas inlet conduit 58 is substantially vertically aligned with a centerline 82 (FIG. 6) which bisects the space between the first end 64 of the gas inlet conduit 58 and the first end 72 of the gas outlet conduit 60. As such, when the first end 64 of the gas inlet conduit 58 is connected to the gas inlet 12 of the gas meter 10 and the first end 72 of the gas outlet conduit 60 is connected to the gas outlet 14 of the gas meter 10, the second end 66 of the gas inlet conduit 58 is substantially vertically aligned with the centerline 56 of the gas meter 10.

The gas inlet conduit 58 can be formed in a variety of sizes and configurations so long as the gas meter loop frame assembly 44 functions and operates in the manner described herein. However, by way of example, FIG. 7 illustrates the gas inlet conduit 58 as having a first section 84, a second section 86, and a third section 88. The first section 84 is substantially straight and vertically extending from the first end 64 of the gas inlet conduit 58 a distance upward therefrom. The second section 86 is arc shaped and extends from the first section 84 in a substantially inverted U-shaped path about a radius 90. The third section 88 is substantially straight and vertically extending from the second section 86 downward to the second end 66 of the gas inlet conduit 58. In order that the connection of the second end 66 of the gas inlet conduit 58 to the gas supply line 40 is made below the top of the gas meter 10, and thus obstructed from view on the front side 52 of the gas meter 10, the second section 86 has a length greater than the length of the first section 84.

The gas outlet conduit 60 is illustrated as being shaped and oriented such that the second end 74 of the gas outlet conduit 60 extends substantially parallel to the centerline 82 of the meter loop frame assembly 44 (FIG. 6). However, it should be understood that the shape and orientation of the gas outlet conduit 60 shown herein is for illustrative purposes only. That is, the gas outlet conduit 60 may be shaped and oriented as needed to accommodate the gas service line 42. If the gas outlet service line 42 is oriented such that it extends to the side of the gas meter 10, similar to that illustrated in FIG. 1, the aesthetic appearance of the gas meter 10 is still enhanced as a result of the gas supply line 40 being positioned on the rear side 54 of the gas meter 10.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A meter loop frame assembly for connecting a gas meter to a gas supply line and a gas service line, the gas supply line having a pressure regulator connected thereto, and the gas meter having a gas inlet, a gas outlet, a front side, a rear side, and a centerline extending from the front side to the rear side, the meter loop frame assembly comprising:

a gas inlet conduit having a first end and a second end with the first end being connectable to the gas inlet of the gas meter and the second end being connectable to the gas supply line;

a gas outlet conduit having a first end and a second end with the first end being connectable to the gas outlet of the gas meter and the second end being connectable to the gas service line; and a brace having one end connected to the gas inlet conduit and another end connected to the gas outlet conduit so as to rigidly connect the gas inlet conduit to the gas outlet conduit, wherein the gas inlet conduit is shaped and oriented such that the second end of the gas inlet conduit is substantially vertically aligned with a centerline bisecting the space between the first end of the gas conduit inlet and the first end of the gas conduit outlet so that when the first end of the gas inlet conduit is connected to the gas inlet of the gas meter and the first end of the gas outlet conduit is connected to the gas outlet of the gas meter, the gas supply line is connectable to the second end of the gas inlet conduit at a location on the rear side of the gas meter so that the pressure regulator of the gas supply line is substantially obstructed from view from a position on the front side of the gas meter.

2. A gas meter assembly, comprising:

a gas supply line having a pressure regulator interposed therein;

a gas service line;

a gas meter having a gas inlet, a gas outlet, a front side, a rear side, and a centerline extending from the front side to the rear side; and a meter loop frame assembly for connecting the gas meter to the gas supply line and the gas service line, the meter loop frame assembly comprising:

a gas inlet conduit having a first end and a second end with the first end being connected to the gas inlet of the gas meter and the second end being connected to the gas supply line; and a gas outlet conduit having a first end and a second end with the first end being connected to the gas outlet of the gas meter and the second end being connected to the gas service line, the gas outlet conduit rigidly connected to the gas inlet conduit so that the first end of the gas inlet conduit is spaced a distance from the first end of the gas outlet conduit which corresponds to the distance between the gas inlet and the gas outlet of the gas meter, wherein the gas inlet conduit is shaped and oriented such that the second end of the gas inlet conduit is positioned on the rear side of the gas meter whereby the gas supply line is connected to the second end of the gas inlet conduit at a location on the rear side of the gas meter so that the pressure regulator of the gas supply line is substantially obstructed from view from a position on the front side of the gas meter.

3. The meter frame loop assembly of claim 2 wherein the second end of the gas inlet conduit is substantially vertically aligned with the centerline of the gas meter.

4. A method for connecting a gas meter to a gas supply line, the gas meter having a gas inlet, a gas outlet, a front side, a rear side, and a centerline extending from the front side to the rear side, the method comprising:

orienting a gas inlet conduit such that first end of the gas inlet conduit is connectable to the gas inlet of the gas meter and a second end of the gas inlet conduit is positioned on the rear side of the gas meter and substantially vertically aligned with the centerline of the gas meter;

connecting the first end of the gas inlet conduit to the gas inlet of the gas meter; and connecting the second end of the gas inlet conduit to the gas supply line whereby a portion of the gas supply line is substantially obstructed from view from a position on the front side of the gas meter.

5. The method of claim 4 further comprising:

connecting a first end of a gas outlet conduit to the gas outlet of the gas meter; and connecting a second end of the gas outlet conduit to a gas service line.

6. A method for connecting a gas meter to a gas supply line, the gas supply line having a pressure regulator connected thereto, and the gas meter having a gas inlet, a gas outlet, a front side, a rear side, and a centerline extending from the front side to the rear side, the method comprising:

orienting a gas inlet conduit such that first end of the gas inlet conduit is connectable to the gas inlet of the gas meter and a second end of the gas inlet conduit is positioned on the rear side of the gas meter;

connecting the first end of the gas inlet conduit to the gas inlet of the gas meter; and connecting the second end of the gas inlet conduit to the gas supply line whereby the pressure regulator of the gas supply line is substantially obstructed from view from a position on the front side of the gas meter.

7. The method of claim 6 further comprising:

orienting the gas inlet conduit such that the second end of the gas inlet conduit is substantially vertically aligned with the centerline of the gas meter.

8. The method of claim 6 further comprising:

connecting a first end of a gas outlet conduit to a gas outlet of the gas meter; and connecting a second end of the gas outlet conduit to a gas service line.

9. The method of claim 8 further comprising:

orienting the gas inlet conduit such that the second end of the gas inlet conduit is substantially vertically aligned with the centerline of the gas meter.

* * * * *